(12) United States Patent
Jin et al.

(10) Patent No.: US 12,305,116 B2
(45) Date of Patent: May 20, 2025

(54) ULTRA-HIGH TEMPERATURE RESISTANT CEMENT SLURRY SYSTEM FOR CEMENTING AND PREPARATION METHOD AND USE THEREOF

(71) Applicants: CHINA NATIONAL PETROLEUM CORPORATION, Beijing (CN); CNPC Engineering Technology R&D Company Limited, Beijing (CN); Beijing Huamei Inc. CNPC, Beijing (CN)

(72) Inventors: Jianzhou Jin, Beijing (CN); Lili Chen, Beijing (CN); Yuchao Guo, Beijing (CN); Hua Zhang, Beijing (CN); Fuchen Liu, Beijing (CN); Yong Ma, Beijing (CN); Yao Wang, Beijing (CN); Xiaobing Zhang, Beijing (CN); Jiaying Zhang, Beijing (CN); Zishuai Liu, Beijing (CN); Haizhi Zhang, Beijing (CN); Pu Xu, Beijing (CN); Youzhi Zheng, Beijing (CN); Yongjin Yu, Beijing (CN); Congfeng Qu, Beijing (CN); Fengzhong Qi, Beijing (CN); Yong Li, Beijing (CN); Ming Xu, Beijing (CN); Guifu Wang, Beijing (CN); Shuoqiong Liu, Beijing (CN); Chi Zhang, Beijing (CN); Bin Lyu, Beijing (CN); Chongfeng Zhou, Beijing (CN); Zhiwei Ding, Beijing (CN); Shunping Zhang, Beijing (CN); Jiwei Jiang, Beijing (CN); Qin Han, Beijing (CN); Yusi Feng, Beijing (CN); Chenyang Zhou, Beijing (CN); Yiliu Sun, Beijing (CN); Songbing Yan, Beijing (CN)

(73) Assignees: China National Petroleum Corporation, Beijing (CN); CNPC Engineering Technology R&D Company Limited, Beijing (CN); Beijing Huamei Inc. CNPC, Beijing (CN)

( * ) Notice: Subject to any disclaimer, the term of this patent is extended or adjusted under 35 U.S.C. 154(b) by 0 days.

(21) Appl. No.: 18/575,671

(22) PCT Filed: Dec. 2, 2022

(86) PCT No.: PCT/CN2022/136092
§ 371 (c)(1),
(2) Date: Dec. 29, 2023

(87) PCT Pub. No.: WO2023/245994
PCT Pub. Date: Dec. 28, 2023

(65) Prior Publication Data
US 2024/0336828 A1 Oct. 10, 2024

(30) Foreign Application Priority Data

Jun. 22, 2022 (CN) .......................... 202210710106.5

(51) Int. Cl.
| | |
|---|---|
| C09K 8/487 | (2006.01) |
| C04B 14/06 | (2006.01) |
| C04B 18/12 | (2006.01) |
| C04B 20/00 | (2006.01) |
| C04B 22/08 | (2006.01) |
| C04B 24/00 | (2006.01) |
| C04B 24/22 | (2006.01) |
| C04B 24/26 | (2006.01) |
| C04B 24/30 | (2006.01) |
| C04B 24/32 | (2006.01) |
| C04B 24/38 | (2006.01) |

(Continued)

(52) U.S. Cl.
CPC .............. *C09K 8/487* (2013.01); *C04B 14/06* (2013.01); *C04B 18/12* (2013.01);
(Continued)

(58) Field of Classification Search
CPC . C09K 8/467; C09K 8/12; C09K 8/34; C09K 8/487; C09K 2208/10; C09K 8/42;
(Continued)

(56) References Cited

U.S. PATENT DOCUMENTS

| | | | | |
|---|---|---|---|---|
| 2016/0257616 A1* | 9/2016 | Walther | .................. | C04B 28/26 |
| 2022/0025243 A1* | 1/2022 | Murakami | .............. | C04B 28/24 |

FOREIGN PATENT DOCUMENTS

| | | |
|---|---|---|
| CN | 102173730 A | 9/2011 |
| CN | 102337108 A | 2/2012 |

(Continued)

OTHER PUBLICATIONS

English Translation of CN 104371678. (Year: 2021).*
(Continued)

*Primary Examiner* — Zakiya W Bates
(74) *Attorney, Agent, or Firm* — LOZA & LOZA, LLP; Michael F. Fedrick

(57) ABSTRACT

An ultra-high temperature resistant cement slurry system comprising cement, an ultra-high temperature strength stabilizer, an ultra-high temperature reinforcing material, a density regulator, an ultra-high temperature suspension stabilizer, a dispersant, a fluid loss additive, a retarder, a defoaming agent and water, wherein the ultra-high temperature suspension stabilizer comprises an ether-based starch, an aluminosilicate and a polyalcohol polymer. The method for preparing the cement slurry system includes dry mixing and wet mixing raw materials homogeneously, respectively, and then homogeneously mixing the dry mix and wet mix to obtain the cement slurry system. The cement slurry system can be used for cementing in deep wells and ultra-deep wells at high and ultra-high temperatures.

19 Claims, No Drawings

(51) Int. Cl.
  *C04B 24/42* (2006.01)
  *C04B 40/00* (2006.01)
  *C04B 103/20* (2006.01)
  *C04B 103/46* (2006.01)
  *C04B 103/50* (2006.01)
  *E21B 33/13* (2006.01)

(52) U.S. Cl.
  CPC .......... *C04B 20/0008* (2013.01); *C04B 22/08* (2013.01); *C04B 24/003* (2013.01); *C04B 24/22* (2013.01); *C04B 24/2623* (2013.01); *C04B 24/2652* (2013.01); *C04B 24/30* (2013.01); *C04B 24/32* (2013.01); *C04B 24/38* (2013.01); *C04B 24/42* (2013.01); *C04B 40/0046* (2013.01); *E21B 33/13* (2013.01); *C04B 2103/20* (2013.01); *C04B 2103/46* (2013.01); *C04B 2103/50* (2013.01); *C04B 2201/20* (2013.01); *C04B 2201/30* (2013.01); *C09K 2208/10* (2013.01)

(58) Field of Classification Search
  CPC ........ E21B 33/138; E21B 33/14; E21B 43/10; E21B 33/13; C04B 2201/20; C04B 28/00; C04B 28/02; C04B 2111/00724; C04B 28/04; C04B 2201/50; C04B 2103/46; C04B 2103/50; C04B 14/062; C04B 2103/20; C04B 14/06; C04B 7/02
  See application file for complete search history.

(56) References Cited

FOREIGN PATENT DOCUMENTS

| | | | |
|---|---|---|---|
| CN | 103694975 A | 4/2014 | |
| CN | 104962260 A | 10/2015 | |
| CN | 105176505 A | 12/2015 | |
| CN | 107162512 A | 9/2017 | |
| CN | 108298902 A | 7/2018 | |
| CN | 108439872 A | 8/2018 | |
| CN | 104371678 B * | 9/2018 | ............ C09K 8/467 |
| CN | 111807748 A | 10/2020 | |
| CN | 112341067 A | 2/2021 | |
| CN | 112939527 A | 6/2021 | |
| CN | 114380540 A | 4/2022 | |
| CN | 114426816 A | 5/2022 | |
| CN | 114516738 A | 5/2022 | |
| RU | 2508307 C2 | 2/2014 | |
| WO | 9409252 A1 | 4/1994 | |

OTHER PUBLICATIONS

Office Action and Search Report issued for counterpart Russian Patent Application No. 2023129245/03 mailed on May 23, 2024.

International Search Report for International Patent Application No. PCT/CN2022/136092, dated Mar. 2, 2023.

International search report issued for counterpart Chinese patent application No. PCT/CN2022/136092 mailed on Mar. 2, 2023.

Chinese Novelty search report issued on May 25, 2022, 10 pgs.

National Standards of People's Republic of China, Standard No. GB/T 19139-2012, "Cement Compressive Strength Test", published Dec. 31, 2012.

Office Action for corresponding Chinese Patent Application No. 20221071016.5 dated Apr. 9, 2025, 13 pages.

Search Report for corresponding Chinese Patent Application No. 20221071016.5 dated Apr. 8, 2025, 4 pages.

\* cited by examiner

ULTRA-HIGH TEMPERATURE RESISTANT CEMENT SLURRY SYSTEM FOR CEMENTING AND PREPARATION METHOD AND USE THEREOF

CROSS-REFERENCE TO RELATED APPLICATIONS

This application is the U.S. national stage of International Patent Application No. PCT/CN2022/136092, filed on Dec. 2, 2022, which claims the benefit of priority under 35 U.S.C. § 119 from Chinese Patent Application No. 202210710106.5, filed on Jun. 22, 2022. The disclosures of the foregoing applications are incorporated herein by reference in their entireties.

FIELD OF TECHNOLOGY

The present disclosure relates to an ultra-high temperature resistant cement slurry system for cementing and the preparation method and use thereof, belonging to the field of drilling technology in the field of oil extraction.

BACKGROUND OF ART

In recent years, 60% of the world's new oil and gas reserves come from deep strata. Deep oil and gas resources have become the main body of the growth of global proven reserves. With the deepening of oil and gas exploration and development, the number of deep wells and ultra-deep wells is gradually increasing, the temperature of wellbore is getting higher and higher, and the temperature at the bottom of the well can reach 240° C. or more. The technology of ultra-high temperature cement slurry for cementing is of great significance to guarantee the exploration as well as development of deep and ultra-deep strata of oil and gas.

During ultra-high temperature cementing in deep wells, there are two main technical difficulties for cement slurry from safe injection in place to long-term effective sealing: (1) poor stability of ultra-high temperature cement slurry, which is endangering construction safety: the cement slurry under high temperature has poor stability and serious delamination, which can easily lead to annular blockage, and in serious cases, there is a risk of "filling sausage": (2) decline in strength of cement stone at ultra-high temperature, which seriously affects the life of the wellbore: the long-term strength of cement stone under high temperature would decline, the sealing effect is poor, the wellbore seal fails, and in severe cases the wellbore is scrapped.

With respect to the above shortcomings, researchers in this field have developed high temperature-resistant cement slurry systems, stabilizers for high temperature-resistant cement slurry systems and the like. For example, CN111807748A discloses a high temperature stabilizer for high-density cement slurry consisting of 76-84 parts by weight of bentonite clay, 10-14 parts by weight of modified diutan gum and 6-10 parts by weight a cross-linked copolymer, and a method for preparing the same. However, the stabilizer is only suitable for high-density systems and has a density variation of more than 0.03 g/cm$^3$. CN107162512A discloses a high temperature resistant cement slurry system for ultra-deep wells, which comprises by weight: 100 parts of cement, 6-18 parts of a high temperature fluid loss additive, 25-40 parts of silica sand, 6-15 parts of a high temperature retarder, 3-5 parts of a high temperature stabilizer, and 0.4-2 parts of a dispersant. Through the development of the high temperature resistant fluid loss additive and high temperature retarder, this cement slurry system improves the fluid loss property of cement slurry and ensures an adjustable thickening time for cement slurry under the condition of 200° C. However, it does not solve the problems such as deterioration of settlement stability of cement slurry and deterioration of strength of cement stone under high temperature conditions.

To address the problem of poor stability of cement slurry under ultra-high temperature conditions, high temperature stabilizers are mainly used in this field to alleviate the problem of settlement destabilization. The high temperature stabilizers mainly include inorganic materials and polymers, which have the advantages such as low cost, simple process and excellent thickening effect. Among them, inorganic high temperature stabilizers are less sensitive to temperature and have the advantages of non-degradation and non-dilution at high temperature, but the thickening side effects are obvious. The initial slurry consistency is high, which leads to the difficulty in ash discharging and pumping, and increases the difficulty of cementing operation. Natural polymer high temperature stabilizers have the characteristics of high viscosity, wide source and low cost, but with the increase of temperature, they will be seriously degraded, the viscosity will be significantly reduced, and the anti-settling ability of the system will be greatly reduced. Synthetic polymer high temperature stabilizers have stable performance and are easy to regulate. It can effectively improve the viscosity of the slurry, and significantly improve the settlement stability of cement slurry. However, its temperature dependence is large. There are shortcomings of hydrolysis and shear thinning at high temperatures, resulting in a significant decrease in the consistency of the slurry and a significant reduction in the anti-settling effect.

To address the problem of cement stone strength decline under ultra-high temperature conditions, cementing techniques such as adding quartz sand to silicate cement to increase the silicon-to-calcium ratio or using aluminate cement are commonly used in this field. By using ordinary sand-added silicate cement, the phenomenon of strength decline at high temperatures can be alleviated, but the problem of cement stone strength decline is not fundamentally solved. The cementing of wells with special cement such as aluminate cement has low strength of formed cement stone (compressive strength is generally 20-30 MPa). In addition, due to the poor compatibility of special cement with the additives for ordinary silicate cement slurry, it is difficult and costly to develop matching additives separately.

Therefore, based on the above situation, one of the urgent problems in this field is to develop an ultra-high temperature resistant cement slurry system for cementing, which has improved settlement stability and prevents the decline of strength of cement stone, and is suitable for ultra-high temperature resistant operations at 200° C. or even 220° C. or more in deep wells and ultra-deep wells.

SUMMARY OF THE INVENTION

In order to solve the above technical problems, an object of the present disclosure is to provide an ultra-high temperature resistant cement slurry system for cementing and the preparation method and use thereof. The ultra-high temperature resistant cement slurry system for cementing provided by the present disclosure has a strong temperature resistance, a wide applicable range, and an excellent settlement stability, while it is able to prevent the decline of strength of cement stone at high temperature, ensure the cementing and sealing effect under high temperature and ultra-high temperature conditions, and improve the cementing quality.

In order to achieve the above purpose, the present disclosure firstly provides an ultra-high temperature resistant cement slurry system for cementing, comprising by weight: 100 parts of cement, 15-50 parts of an ultra-high temperature strength stabilizer, 15-50 parts of an ultra-high temperature reinforcing material, 0-140 parts of a density regulator, 1-6 parts of an ultra-high temperature suspension stabilizer, 0-2 parts of a dispersant, 2-9 parts of a fluid loss additive, 0.1-9 parts of a retarder, 0.1-0.5 part of a defoaming agent, and 40-120 parts of water: wherein the ultra-high temperature suspension stabilizer comprises by weight 1-3 parts of an ether-based starch, 1-3 parts of an aluminosilicate, and 1-2 parts of a polyalcohol polymer.

According to a specific embodiment of the present disclosure, preferably, the ultra-high temperature resistant cement slurry system for cementing comprises by weight: 100 parts of cement, 20-50 parts of the ultra-high temperature strength stabilizer, 15-30 parts of the ultra-high temperature reinforcing material, 0-140 parts of the density regulator, 3-6 parts of the ultra-high temperature suspension stabilizer, 0.5-2 parts of the dispersant, 2-7 parts of the fluid loss additive, 1-6 parts of the retarder, 0.1-0.5 part of the defoaming agent, and 40-120 parts of water.

In the ultra-high temperature resistant cement slurry system for cementing, preferably, the ultra-high temperature suspension stabilizer comprises a combination of the ether-based starch, the aluminosilicate and the polyalcohol polymer in a weight ratio of 1:2:1.

In the ultra-high temperature resistant cement slurry system for cementing, preferably, the ether-based starch comprises one or more of carboxymethyl starch, carboxyethyl starch, carboxypropyl starch, carboxyhexyl starch, sulfoethyl starch, and sulfo-2-hydroxypropyl starch.

In the ultra-high temperature resistant cement slurry system for cementing, preferably, the aluminosilicate is a nano-sized aluminosilicate, which may have a size of 1-100 nm in diameter and/or 0.5-30 μm in length. More preferably, the nano-sized aluminosilicate comprises one or more of nano-sized orthoclase, nano-sized zeolite, nano-sized anorthite, nano-sized halloysite, and the like. Even more preferably, the nano-sized aluminosilicate comprises nano-sized zeolite and/or nano-sized halloysite, and the like. The specific type of the nano-sized zeolite is not specifically limited in the present disclosure, as long as the particle size thereof meets the above requirements of the present disclosure.

In the ultra-high temperature resistant cement slurry system for cementing, preferably, the polyalcohol polymer comprises one or more of polyvinyl alcohol, polyethylene glycol, polyethylene oxide, and the like. Among them, the molecular weight of polyethylene glycol is 200 to 20000, and the molecular weight of polyethylene oxide is 20000 or more.

In the ultra-high temperature resistant cement slurry system for cementing, preferably, the ultra-high temperature suspension stabilizer is prepared by homogeneously mixing 1-3 parts by weight of the ether-based starch, 1-3 parts by weight of the aluminosilicate and 1-2 parts by weight of the polyalcohol polymer to obtain the ultra-high temperature suspension stabilizer.

In the ultra-high temperature resistant cement slurry system for cementing, preferably, the ultra-high temperature reinforcing material comprises one or more of halloysite, mullite, tricalcium phosphate, and the like. More preferably, the ultra-high temperature reinforcing material comprises a mixture of halloysite, mullite and tricalcium phosphate in a weight ratio of (1-2):(1-2):(1-2).

In the ultra-high temperature resistant cement slurry system for cementing, preferably, the ultra-high temperature strength stabilizer comprises quartz sand and the like. More preferably, the ultra-high temperature strength stabilizer comprises high purity acid-washed quartz sand of 100-1500 mesh and/or high purity quartz sand of 100-1500 mesh: even more preferably, the ultra-high temperature strength stabilizer comprises high purity acid-washed quartz sand of 600 mesh and/or high purity quartz sand of 1500 mesh. Among them, each of the high purity acid-washed quartz sand and the high purity quartz sand has a purity of 97% or more.

In the ultra-high temperature resistant cement slurry system for cementing, preferably, the density regulator comprises refined iron mine powder and/or glass microbead, and the like. More preferably, the refined iron mine powder has a density of 5.05-7.20 g/cm$^3$, and the glass microbead has a density of 0.44-0.65 g/cm$^3$ (particularly preferably 0.6 g/cm$^3$).

In the ultra-high temperature resistant cement slurry system for cementing, preferably, the dispersant comprises an aldehyde-ketone polycondensate-based dispersant and/or a polystyrene sulfonate-based dispersant, and the like. Among them, each of the aldehyde-ketone polycondensate-based dispersant and polystyrene sulfonate-based dispersant may be a dispersant for cement slurry system conventionally used in the art. For example, the aldehyde-ketone polycondensate-based dispersant may comprise one or more of dispersant DRS-1S, dispersant SAF, dispersant SXY, dispersant USZ, dispersant SDJZ-1, and the like. The polystyrene sulfonate-based dispersant may comprise sodium polystyrene sulfonate and the like. More preferably, the dispersant is dispersant DRS-1S.

In the ultra-high temperature resistant cement slurry system for cementing, preferably, the fluid loss additive comprises an acrylamide polymer-based fluid loss additive and the like. The fluid loss additive may be a fluid loss additive for cement slurry system conventionally used in the art. More preferably, the fluid loss additive comprises one or more of fluid loss additive DRF-2L, fluid loss additive PC-G83L, fluid loss additive PC-G80L, fluid loss additive LX-1, and the like. Even more preferably, the fluid loss additive is fluid loss additive DRF-2L.

In the ultra-high temperature resistant cement slurry system for cementing, preferably, the retarder comprises an acrylamide polymer-based retarder and/or a 2-acrylamide-2-methylpropanesulfonic acid polymer-based retarder and the like. The retarder may be a retarder for cement slurry system conventionally used in the art. More preferably, the retarder comprises one or more of retarder DRH-2L, retarder JXH-2L, retarder HX-36L, and the like. Even more preferably, the retarder is retarder DRH-2L.

In the ultra-high temperature resistant cement slurry system for cementing, preferably, the defoaming agent comprises one or more of an organic ester, polyoxypropylene glycerol ether, polydimethylsiloxane, and the like: more preferably, the organic ester comprises tributyl phosphate. The defoaming agent may be a defoaming agent for cement slurry system conventionally used in the art. Even more preferably, the defoaming agent is an organic ester-based defoaming agent DRX-1L.

In the ultra-high temperature resistant cement slurry system for cementing, preferably, the cement comprises class G oil well cement, for example, one or more of Jiahua class G, Huayou class G, Shengwei class G, Mengcheng class G, and the like.

According to a specific embodiment of the present disclosure, preferably, the ultra-high temperature resistant cement slurry system for cementing has a density of 1.35-2.35 g/cm³, an applicable temperature of 30° C.-240° C., and a density variation of not more than 0.04 g/cm³ (preferably not more than 0.03 g/cm³) in the applicable temperature range. More preferably, the ultra-high temperature resistant cement slurry system for cementing has an applicable temperature of 200° C.-240° C. and a density variation of not more than 0.04 g/cm³ (preferably not more than 0.03 g/cm³) in the applicable temperature range (i.e., under the condition of 200° C.-240° C.). Even more preferably, the ultra-high temperature resistant cement slurry system for cementing has an applicable temperature of 220° C.-240° C. and a density variation of not more than 0.04 g/cm³ (preferably not more than 0.03 g/cm³) in the applicable temperature range (i.e., under the condition of 220° C.-240° C.).

The ultra-high temperature suspension stabilizer used in the ultra-high temperature resistant cement slurry system for cementing of the present disclosure is a combination of the ether-based starch, the aluminosilicate and the polyalcohol polymer in a weight ratio of (1-3):(1-3):(1-2). The ultrahigh-temperature suspension stabilizer is formed by compounding the ether-based starch, the aluminosilicate, and the polyalcohol polymer in the specific ratio. Through the introduction of temperature and salt resistant groups in the polyalcohol polymer, and the introduction of an inorganic mineral material (i.e., the aluminosilicate) and an organic small-molecule thickening substance (i.e., the ether-based starch), a synergistic effect is produced by compounding the three in a specific ratio, achieving the effect of excellent suspension stability against ultra-high temperatures in the cement slurry system, so that the cement slurry system may maintain an excellent settlement stability even under the high temperature condition of 240° C.

The cement slurry system of the present disclosure further contains other components such as an ultra-high temperature reinforcing material and an ultra-high temperature strength stabilizer, which produces a synergistic effect with the ultra-high temperature suspension stabilizer in the present disclosure, so that the cement slurry system of the present disclosure has an applicable temperature range of 30° C. to 240° C., and an excellent settlement stability of the cement slurry system at high temperatures and ultra-high temperatures: the density variation is not more than 0.04 g/cm³ (preferably not more than 0.03 g/cm³) when operating in the applicable temperature range, particularly, the density variation is not more than 0.04 g/cm³ (preferably not more than 0.03 g/cm³) when operating at 220° C. to 240° C.: the density is adjustable and the thickening curve is normal, to meet the requirement of different working conditions on the density of the cement slurry system. At the same time, it can effectively prevent the decline of strength of cement stone at high temperature and have a compressive strength of cement stone of more than 35 MPa; and can ensure the cementing and sealing effect in deep wells and ultra-deep wells under the conditions of high temperature and ultra-high temperature and improve the cementing quality:

In another aspect, the present disclosure further provides a method for preparing the ultra-high temperature resistant cement slurry system for cementing, which comprises the steps of (1) homogeneously mixing by weight 100 parts of cement, 15-50 parts (preferably 20-50 parts) of the ultra-high temperature strength stabilizer, 15-50 parts (preferably 15-30 parts) of the ultra-high temperature reinforcing material, 0-140 parts of the density regulator, 1-6 parts (preferably 3-6 parts) of the ultra-high temperature suspension stabilizer, and 0-2 parts (preferably 0-2 parts) of the dispersant, to obtain a dry mix: (2) homogeneously mixing by weight 2-9 parts (preferably 2-7 parts) of the fluid loss additive, 0.1-9 parts (preferably 1-6 parts) of the retarder, 0.1-0.5 part of the defoaming agent and 40-120 parts of water, to obtain a wet mix: (3) under stirring, uniformly adding the dry mix obtained from step (1) into the wet mix obtained from step (2), and continuing to stir for a period of time, to obtain the ultra-high temperature resistant cement slurry system for cementing.

In the method, preferably, in step (3), the dry mix obtained from step (1) is uniformly added into the wet mix obtained from step (2) at a rotational speed of 4,000±200 r/min, and then the stirring is continued for 35-50 s at a rotational speed of 12,000±500 r/min, to obtain the ultra-high temperature resistant cement slurry system for cementing.

Additionally, the present disclosure further provides use of the ultra-high temperature resistant cement slurry system for cementing, for cementing in deep wells and/or ultra-deep wells and/or extra-ultra-deep wells at high and/or ultra-high temperatures.

In the use of the ultra-high temperature resistant cement slurry system for cementing for cementing in deep wells and/or ultra-deep wells and/or extra-ultra-deep wells at high and/or ultra-high temperatures, preferably, the high and/or ultra-high temperatures are 200° C.-240° C., preferably 220° C.-240° C.: the deep wells have a depth of 4500-6000 m, the ultra-deep wells have a depth of 6000-9000 m, and the extra-ultra-deep wells have a depth of 9000 m or more.

In sum, the ultra-high temperature resistant cement slurry system for cementing provided by the present disclosure has a strong temperature resistance, a wide applicable range (an applicable temperature of 30° C.-240° C.), and an excellent settlement stability. The cement slurry system has a density of 1.35-2.35 g/cm³ and a density variation of not more than 0.04 g/cm³ (preferably not more than 0.03 g/cm³) when operating at the applicable temperature (particularly at 220° C. to 240° C.): the density is adjustable to meet the requirement on the density of the cement slurry system under different working conditions. Moreover, the cement slurry system has an adjustable thickening time within the applicable temperature range, a low initial consistency during thickening, and a short ash time (within 50 s). Moreover, it has excellent rheological properties and small thixotropy, which avoids the problems of "bulging" and "stepping" of the thickening curve and makes the thickening curve normal. At the same time, the cement slurry system of the present disclosure can prevent the decline of strength of cement stone at high temperature and make the 28 d compressive strength of cement stone more than 35 MPa. Therefore, the ultra-high temperature resistant cement slurry system for cementing of the present disclosure can ensure the cementing and sealing effect in deep wells, ultra-deep wells and extra-ultra-deep wells under the conditions of high temperature and ultra-high temperature, and improve the cementing quality.

DETAILED DESCRIPTION OF PREFERRED EMBODIMENTS

In order to have a clearer understanding of the technical features, purposes and beneficial effects of the present disclosure, the technical solution of the present disclosure is hereby described in detail below in conjunction with the following specific examples, which should not be construed as limiting the implementable scope of the present disclosure.

The experiments are carried out in accordance with GB/T 19139-2012 "Testing of well cements" to evaluate the thickening performance, fluidity, API fluid loss, free water content, settlement stability, and compressive strength of the cement slurry systems prepared by the following Examples and Comparative Examples. The main experimental instruments include: Model 30-60 corrugation stirrer and Model 8240 high temperature and high pressure consistometer, products of CHANDLER: Model HH-420 constant temperature digital water tank, Changzhou YINENG Experimental Instrument Factory.

The oil well cement used during the following experiments is High Sulfate Resistant (HSR) Class G oil well cement, produced by Jiahua Special Cement Co., Ltd. The experimental water was distilled water. The biopolymer-based suspension stabilizer DRK-3S, sulfonated aldehyde-ketone polycondensate-based dispersant DRS-1S, acrylamide polymer-based retarder DRH-2L, acrylamide polymer-based fluid loss additive DRF-2L and organic ester-based defoaming agent DRX-1L in the formulation of the cement slurry system are produced by China Petroleum Corporation Engineering & Technology Research Institute Co., Ltd.

Example 1

This example provided an ultra-high temperature resistant cement slurry system for cementing, comprising by weight: 100 parts of Jiahua class G oil well cement, 50 parts of an ultra-high temperature strength stabilizer (acid-washed quartz sand of 600 mesh with a purity of 97% or more), 20 parts of an ultra-high temperature reinforcing material (a mixture of halloysite, mullite and tricalcium phosphate in a weight ratio of 1:1:1), 3 parts of an ultra-high temperature suspension stabilizer (a mixture of sodium carboxymethyl starch (i.e., carboxymethyl starch), nano-sized halloysite powder and polyethylene glycol in a weight ratio of 1:1:1, wherein the size of the nano-sized halloysite powder is 30-100 nm in diameter and 0.5-1 µm in length), 1.2 parts of a dispersant DRS-1S, 4 parts of a fluid loss additive DRF-2L, 3 parts of a retarder DRH-2L, 0.2 part of a defoaming agent DRX-1L, and 58 parts of water.

The ultra-high temperature resistant cement slurry system for cementing in this example was prepared by the following method: (1) the class G oil well cement, the ultra-high temperature strength stabilizer, the ultra-high temperature reinforcing material, the ultra-high temperature suspension stabilizer and the dispersant were homogeneously mixed in the above proportions to obtain a dry mix: (2) the fluid loss additive, the retarder, the defoaming agent and water were homogeneously mixed in the above proportions to obtain a wet mix: (3) the dry mix obtained from step (1) was uniformly added into the wet mix obtained from step (2) at a rotational speed of 4,000±200 r/min, and after the dry mix was completely added to the wet mix, the mixing cup was covered with a lid, the rotational speed of the stirrer was adjusted to 12000±500 r/min, and stirring was continued for 35 s, to obtain the ultra-high temperature resistant cement slurry system for cementing.

The density of the ultra-high temperature resistant cement slurry system for cementing in this example is 1.90 g/cm$^3$, and the results of various experiments are shown in Table 1.

Example 2

This examples provided an ultra-high temperature resistant cement slurry system for cementing, comprising by weight: 100 parts of Jiahua class G oil well cement, 30 parts of an ultra-high temperature strength stabilizer (acid-washed quartz sand of 600 mesh with a purity of 97% or more), 20 parts of an ultra-high temperature reinforcing material (a mixture of halloysite, mullite and tricalcium phosphate in a weight ratio of 1:1:1), 35 parts of a density regulator (hollow glass microbead with a density of 0.60 g/cm$^3$), 4.5 parts of an ultra-high temperature suspension stabilizer (a mixture of sodium carboxymethyl starch, nano-sized halloysite powder and polyethylene glycol in a weight ratio of 1:2:1, wherein the size of the nano-sized halloysite powder is 30-100 nm in diameter and 0.5-1 µm in length), 1 part of a dispersant DRS-1S, 6 parts of a fluid loss additive DRF-2L, 4 parts of a retarder DRH-2L, 0.2 part of a defoaming agent DRX-1L, and 115 parts of water.

The ultra-high temperature resistant cement slurry system for cementing in this example was prepared by the following method: (1) the class G oil well cement, the ultra-high temperature strength stabilizer, the ultra-high temperature reinforcing material, the density regulator, the ultra-high temperature suspension stabilizer and the dispersant were homogeneously mixed in the above proportions to obtain a dry mix: (2) the fluid loss additive, the retarder, the defoaming agent and water were homogeneously mixed in the above proportions to obtain a wet mix: (3) the dry mix obtained from step (1) was uniformly added into the wet mix obtained from step (2) at a rotational speed of 4,000±200 r/min, and after the dry mix was completely added to the wet mix, the mixing cup was covered with a lid, the rotational speed of the stirrer was adjusted to 12000±500 r/min, and stirring was continued for 35 s, to obtain the ultra-high temperature resistant cement slurry system for cementing.

The density of the ultra-high temperature resistant cement slurry system for cementing in this example is 1.35 g/cm$^3$, and the results of various experiments are shown in Table 1.

Example 3

This examples provided an ultra-high temperature resistant cement slurry system for cementing, comprising by weight: 100 parts of Jiahua class G oil well cement, 50 parts of an ultra-high temperature strength stabilizer (acid-washed quartz sand of 600 mesh with a purity of 97% or more), 20 parts of an ultra-high temperature reinforcing material (a mixture of halloysite, mullite and tricalcium phosphate in a weight ratio of 1:1:1), 4 parts of an ultra-high temperature suspension stabilizer (a mixture of sodium carboxymethyl starch, nano-sized halloysite powder and polyethylene glycol in a weight ratio of 1:2:1, wherein the size of the nano-sized halloysite powder is 30-100 nm in diameter and 0.5-1 µm in length), 1.2 parts of a dispersant DRS-1S, 3.2 parts of a fluid loss additive DRF-2L, 3.2 parts of a retarder DRH-2L, 0.2 part of a defoaming agent DRX-1L, and 58 parts of water.

The method for preparing the ultra-high temperature resistant cement slurry system for cementing in this example was the same as that of Example 1.

The density of the ultra-high temperature resistant cement slurry system for cementing in this example is 1.90 g/cm$^3$, and the results of various experiments are shown in Table 1.

Example 4

This examples provided an ultra-high temperature resistant cement slurry system for cementing, comprising by weight: 100 parts of Jiahua class G oil well cement, 50 parts of an ultra-high temperature strength stabilizer (acid-washed quartz sand of 600 mesh with a purity of 97% or more), 20 parts of an ultra-high temperature reinforcing material (a mixture of halloysite, mullite and tricalcium phosphate in a weight ratio of 1:1:1), 140 parts of a density regulator (iron mine powder with a density of 7.20 g/cm$^3$), 5.5 parts of an ultra-high temperature suspension stabilizer (a mixture of sodium carboxymethyl starch, nano-sized halloysite powder and polyethylene glycol in a weight ratio of 1:2:1, wherein the size of the nano-sized halloysite powder is 30-100 nm in diameter and 0.5-1 μm in length), 1.5 parts of a dispersant DRS-1S, 4.5 parts of a fluid loss additive DRF-2L, 3.5 parts of a retarder DRH-2L, 0.2 part of a defoaming agent DRX-1L, and 96 parts of water.

The method for preparing the ultra-high temperature resistant cement slurry system for cementing in this example was the same as that of Example 2.

The density of the ultra-high temperature resistant cement slurry system for cementing in this example is 2.35 g/cm$^3$, and the results of various experiments are shown in Table 1.

Example 5

This examples provided an ultra-high temperature resistant cement slurry system for cementing, comprising by weight: 100 parts of Jiahua class G oil well cement, 50 parts of an ultra-high temperature strength stabilizer (acid-washed quartz sand of 600 mesh with a purity of 97% or more), 20 parts of an ultra-high temperature reinforcing material (a mixture of halloysite, mullite and tricalcium phosphate in a weight ratio of 1:1:1), 4.5 parts of an ultra-high temperature suspension stabilizer (a mixture of sodium carboxymethyl starch, nano-sized halloysite powder and polyethylene glycol in a weight ratio of 1:2:1, wherein the size of the nano-sized halloysite powder is 30-100 nm in diameter and 0.5-1 μm in length), 1.2 parts of a dispersant DRS-1S, 5.5 parts of a fluid loss additive DRF-2L, 5 parts of a retarder DRH-2L, 0.2 part of a defoaming agent DRX-1L, and 58 parts of water.

The method for preparing the ultra-high temperature resistant cement slurry system for cementing in this example was the same as that of Example 1.

The density of the ultra-high temperature resistant cement slurry system for cementing in this example is 1.90 g/cm$^3$, and the results of various experiments are shown in Table 1.

Example 6

This examples provided an ultra-high temperature resistant cement slurry composition for cementing, comprising by weight: 100 parts of Jiahua class G oil well cement, 50 parts of an ultra-high temperature strength stabilizer (acid-washed quartz sand of 600 mesh with a purity of 97% or more), 20 parts of an ultra-high temperature reinforcing material (a mixture of halloysite, mullite and tricalcium phosphate in a weight ratio of 1:1:1), 4 parts of an ultra-high temperature suspension stabilizer (a mixture of sodium carboxymethyl starch, nano-sized halloysite powder and polyethylene glycol in a weight ratio of 1:1:1, wherein the size of the nano-sized halloysite powder is 30-100 nm in diameter and 0.5-1 μm in length), 1.2 parts of a dispersant DRS-1S, 3.2 parts of a fluid loss additive DRF-2L, 3.2 parts of a retarder DRH-2L, 0.2 part of a defoaming agent DRX-1L, and 58 parts of water.

The method for preparing the ultra-high temperature resistant cement slurry composition for cementing in this example was the same as that of Example 1.

The density of the ultra-high temperature resistant cement slurry composition for cementing in this example is 1.90 g/cm$^3$, and the results of various experiments are shown in Table 2.

Example 7

This examples provided an ultra-high temperature resistant cement slurry composition for cementing, comprising by weight: 100 parts of Jiahua class G oil well cement, 50 parts of an ultra-high temperature strength stabilizer (acid-washed quartz sand of 600 mesh with a purity of 97% or more), 20 parts of an ultra-high temperature reinforcing material (a mixture of halloysite, mullite and tricalcium phosphate in a weight ratio of 2:2:1), 4 parts of an ultra-high temperature suspension stabilizer (a mixture of sodium carboxymethyl starch, nano-sized halloysite powder and polyethylene glycol in a weight ratio of 1:2:1, wherein the size of the nano-sized halloysite powder is 30-100 nm in diameter and 0.5-1 μm in length), 1.2 parts of a dispersant DRS-1S, 3.2 parts of a fluid loss additive DRF-2L, 3.2 parts of a retarder DRH-2L, 0.2 part of a defoaming agent DRX-1L, and 58 parts of water.

The method for preparing the ultra-high temperature resistant cement slurry composition for cementing in this example was the same as that of Example 1.

The density of the ultra-high temperature resistant cement slurry composition for cementing in this example is 1.90 g/cm$^3$, and the results of various experiments are shown in Table 2.

Example 8

This examples provided an ultra-high temperature resistant cement slurry composition for cementing, comprising by weight: 100 parts of Jiahua class G oil well cement, 50 parts of an ultra-high temperature strength stabilizer (acid-washed quartz sand of 600 mesh with a purity of 97% or more), 20 parts of an ultra-high temperature reinforcing material (a mixture of halloysite, mullite and tricalcium phosphate in a weight ratio of 1:1:1), 4 parts of an ultra-high temperature suspension stabilizer (a mixture of sodium carboxymethyl starch, nano-sized halloysite powder and polyethylene glycol in a weight ratio of 1:2:1, wherein the size of the nano-sized halloysite powder is 30-100 nm in diameter and 0.5-1 μm in length), 1.2 parts of a dispersant DRS-1S, 3.2 parts of a fluid loss additive DRF-2L, 3.2 parts of a retarder DRH-2L, 0.2 part of a defoaming agent DRX-1L, and 58 parts of water.

The method for preparing the ultra-high temperature resistant cement slurry composition for cementing in this example was the same as that of Example 1.

The density of the ultra-high temperature resistant cement slurry composition for cementing in this example is 1.90 g/cm$^3$, and the results of various experiments are shown in Table 2.

Example 9

This examples provided an ultra-high temperature resistant cement slurry composition for cementing, comprising by weight: 100 parts of Jiahua class G oil well cement, 50 parts of an ultra-high temperature strength stabilizer (acid-washed quartz sand of 600 mesh with a purity of 97% or more), 20 parts of an ultra-high temperature reinforcing material (a mixture of halloysite, mullite and tricalcium phosphate in a weight ratio of 2:2:1), 4 parts of an ultra-high temperature suspension stabilizer (a mixture of sodium carboxypropyl starch, nano-sized halloysite powder and polyethylene oxide in a weight ratio of 1:2:1, wherein the size of the nano-sized halloysite powder is 30-100 nm in diameter and 0.5-1 μm in length), 1.2 parts of a dispersant DRS-1S, 3.2 parts of a fluid loss additive DRF-2L, 3.2 parts of a retarder DRH-2L, 0.2 part of a defoaming agent DRX-1L, and 58 parts of water.

The method for preparing the ultra-high temperature resistant cement slurry composition for cementing in this example was the same as that of Example 1.

The density of the ultra-high temperature resistant cement slurry composition for cementing in this example is 1.90 g/cm$^3$, and the results of various experiments are shown in Table 2.

Example 10

This examples provided an ultra-high temperature resistant cement slurry composition for cementing, comprising by weight: 100 parts of Jiahua class G oil well cement, 50 parts of an ultra-high temperature strength stabilizer (acid-washed quartz sand of 600 mesh with a purity of 97% or more), 20 parts of an ultra-high temperature reinforcing material (a mixture of halloysite, mullite and tricalcium phosphate in a weight ratio of 2:2:1), 4 parts of an ultra-high temperature suspension stabilizer (a mixture of carboxyhexyl starch, nano-sized zeolite and polyethylene glycol in a weight ratio of 1:2:1, wherein the size of the nano-sized zeolite is 30-100 nm in particle diameter), 1.2 parts of a dispersant DRS-1S, 3.2 parts of a fluid loss additive DRF-2L, 3.2 parts of a retarder DRH-2L, 0.2 part of a defoaming agent DRX-1L, and 58 parts of water.

The method for preparing the ultra-high temperature resistant cement slurry composition for cementing in this example was the same as that of Example 1.

The density of the ultra-high temperature resistant cement slurry composition for cementing in this example is 1.90 g/cm$^3$, and the results of various experiments are shown in Table 2.

Example 11

This examples provided an ultra-high temperature resistant cement slurry system for cementing, comprising by weight: 100 parts of Jiahua class G oil well cement, 50 parts of an ultra-high temperature strength stabilizer (acid-washed quartz sand of 600 mesh with a purity of 97% or more), 20 parts of an ultra-high temperature reinforcing material (a mixture of halloysite, mullite and tricalcium phosphate in a weight ratio of 2:2:1), 4 parts of an ultra-high temperature suspension stabilizer (a mixture of sodium carboxymethyl starch, nano-sized zeolite and polyvinyl alcohol in a weight ratio of 1:2:1, wherein the size of the nano-sized zeolite is 30-100 nm in particle diameter), 1.2 parts of a dispersant DRS-1S, 4 parts of a fluid loss additive DRF-2L, 3 parts of a retarder DRH-2L, 0.2 part of a defoaming agent DRX-1L, and 58 parts of water.

The method for preparing the ultra-high temperature resistant cement slurry composition for cementing in this example was the same as that of Example 1.

The density of the ultra-high temperature resistant cement slurry composition for cementing in this example is 1.90 g/cm$^3$, and the results of various experiments are shown in Table 2.

Comparative Example 1

This comparative example provided a cement slurry system, comprising by weight: 100 parts of Jiahua class G oil well cement, 50 parts of an ultra-high temperature strength stabilizer (acid-washed quartz sand of 600 mesh with a purity of 97% or more), 2.5 parts of a biopolymer-based suspension stabilizer DRK-3S, 1.2 parts of a dispersant DRS-1S, 4 parts of a fluid loss additive DRF-2L, 3 parts of a retarder DRH-2L, 0.2 part of a defoaming agent DRX-1L, and 51 parts of water.

The cement slurry system in this comparative example was prepared by the following method: (1) the class G oil well cement, the ultra-high temperature strength stabilizer, the suspension stabilizer and the dispersant were homogeneously mixed in the above proportions to obtain a dry mix: (2) the fluid loss additive, the retarder, the defoaming agent and water were homogeneously mixed in the above proportions to obtain a wet mix: (3) the dry mix obtained from step (1) was uniformly added into the wet mix obtained from step (2) at a rotational speed of 4,000±200 r/min, and after the dry mix was completely added to the wet mix, the mixing cup was covered with a lid, the rotational speed of the stirrer was adjusted to 12000±500 r/min, and stirring was continued for 35 s, to obtain the cement slurry system.

The density of the cement slurry system in this comparative example is 1.90 g/cm$^3$, and the results of various experiments are shown in Table 3.

Comparative Example 2

This comparative example provided a cement slurry system, comprising by weight: 100 parts of Jiahua class G oil well cement, 50 parts of an ultra-high temperature strength stabilizer (acid-washed quartz sand of 600 mesh with a purity of 97% or more), 3 parts of a biopolymer-based suspension stabilizer DRK-3S, 1.2 parts of a dispersant DRS-1S, 4.5 parts of a fluid loss additive DRF-2L, 4 parts of a retarder DRH-2L, 0.2 part of a defoaming agent DRX-1L, and 51 parts of water.

The method for preparing the cement slurry system in this comparative example was the same as that of Comparative Example 1.

The density of the cement slurry system in this comparative example is 1.90 g/cm$^3$, and the results of various experiments are shown in Table 3.

Comparative Example 3

This comparative example provided a cement slurry system, comprising by weight: 100 parts of Jiahua class G oil well cement, 50 parts of an ultra-high temperature strength stabilizer (acid-washed quartz sand of 600 mesh with a purity of 97% or more), 3.5 parts of a biopolymer-based suspension stabilizer DRK-3S, 1.2 parts of a dispersant DRS-1S, 5.5 parts of a fluid loss additive DRF-2L, 5 parts of a retarder DRH-2L, 0.2 part of a defoaming agent DRX-1L, and 51 parts of water.

The method for preparing the cement slurry system in this comparative example was the same as that of Comparative Example 1.

The density of the cement slurry system in this comparative example is 1.90 g/cm$^3$, and the results of various experiments are shown in Table 3.

Comparative Example 4

This comparative example provided a cement slurry system, comprising by weight: 100 parts of Jiahua class G oil well cement, 50 parts of an ultra-high temperature strength stabilizer (acid-washed quartz sand of 600 mesh with a purity of 97% or more), 20 parts of an ultra-high temperature reinforcing material (a mixture of halloysite, mullite and tricalcium phosphate in a weight ratio of 1:1:1), 4 parts of a high temperature suspension stabilizer (a mixture of sodium carboxymethyl starch, aluminum sulfate and polyethylene glycol in a weight ratio of 1:2:1), 1.2 parts of a dispersant DRS-1S, 5.5 parts of a fluid loss additive DRF-2L, 5.5 parts of a retarder DRH-2L, 0.2 part of a defoaming agent DRX-1L, and 58 parts of water.

The method for preparing the cement slurry system in this comparative example was the same as that of Comparative Example 1.

The density of the cement slurry system in this comparative example is 1.90 g/cm$^3$, and the results of various experiments are shown in Table 3.

Comparative Example 5

This comparative example provided a cement slurry system, comprising by weight: 100 parts of Jiahua class G oil well cement, 50 parts of an ultra-high temperature strength stabilizer (acid-washed quartz sand of 600 mesh with a purity of 97% or more), 20 parts of an ultra-high temperature reinforcing material (a mixture of halloysite, mullite and tricalcium phosphate in a weight ratio of 1:1:1), 4.5 parts of a high temperature suspension stabilizer (a mixture of sodium carboxymethyl starch and nano-sized halloysite powder in a weight ratio of 1:2, wherein the size of the nano-sized halloysite powder is 30-100 nm in diameter and 0.5-1 μm in length), 1.2 parts of a dispersant DRS-1S, 5.5 parts of a fluid loss additive DRF-2L, 5 parts of a retarder DRH-2L, 0.2 part of a defoaming agent DRX-1L, and 58 parts of water.

The method for preparing the cement slurry system in this comparative example was the same as that of Comparative Example 1.

The density of the cement slurry system in this comparative example is 1.90 g/cm$^3$, and the results of various experiments are shown in Table 3.

Comparative Example 6

This comparative example provided a cement slurry system, comprising by weight: 100 parts of Jiahua class G oil well cement, 50 parts of an ultra-high temperature strength stabilizer (acid-washed quartz sand of 600 mesh with a purity of 97% or more), 20 parts of a high temperature reinforcing material (metakaolin of 300 mesh), 4.5 parts of a high temperature suspension stabilizer (a mixture of sodium carboxymethyl starch, nano-sized halloysite powder and polyethylene glycol in a weight ratio of 1:2:1, wherein the size of the nano-sized halloysite powder is 30-100 nm in diameter and 0.5-1 μm in length), 1.2 parts of a dispersant DRS-1S, 5.5 parts of a fluid loss additive DRF-2L, 5 parts of a retarder DRH-2L, 0.2 part of a defoaming agent DRX-1L, and 58 parts of water.

The method for preparing the cement slurry system in this comparative example was the same as that of Comparative Example 1.

The density of the cement slurry system in this comparative example is 1.90 g/cm$^3$, and the results of various experiments are shown in Table 3.

TABLE 1

|  | Items | Example 1 | Example 2 | Example 3 | Example 4 | Example 5 |
|---|---|---|---|---|---|---|
|  | Density, g/cm$^3$ | 1.90 | 1.35 | 1.90 | 2.35 | 1.90 |
|  | Fluidity, cm | 24 | 23 | 24 | 23 | 23 |
|  | API fluid loss, ml | 36 | 46 | 37 | 42 | 38 |
|  | Free water, % | 0 | 0 | 0 | 0 | 0 |
|  | Stability (density variation), g/cm$^3$ | 0.01 | 0.02 | 0.02 | 0.03 | 0.03 |
| Thickening properties | Resting temperature, °C. | 200 | 220 | 220 | 220 | 240 |
|  | Cycling temperature, °C. | 180 | 200 | 200 | 200 | 220 |
|  | Thickening time, min | 227 | 268 | 282 | 274 | 275 |
|  | Thickening linerity | normal | normal | normal | normal | normal |
| Compressive strength | 7 d compressive strength, Mpa | 42.5 | 36.4 | 40.8 | 43.6 | 46.2 |
|  | 28 d compressive strength, Mpa | 45.1 | 37.9 | 42.3 | 45.2 | 48.8 |

TABLE 2

| Items | Example 6 | Example 7 | Example 8 | Example 9 | Example 10 | Example 11 |
|---|---|---|---|---|---|---|
| Density, g/cm$^3$ | 1.90 | 1.90 | 1.90 | 1.90 | 1.90 | 1.90 |
| Fluidity, cm | 24 | 23 | 24 | 23 | 24 | 24 |
| API fluid loss, ml | 38 | 36 | 39 | 37 | 38 | 40 |
| Free water, % | 0 | 0 | 0 | 0 | 0 | 0 |
| Stability (density variation) g/cm$^3$ | 0.04 | 0.02 | 0.01 | 0.03 | 0.03 | 0.03 |
| Thickening properties  Resting temperature, °C. | 220 | 220 | 220 | 220 | 220 | 220 |
| Cycling temperature, °C. | 200 | 200 | 200 | 200 | 200 | 200 |
| Thickening time, min | 277 | 286 | 291 | 272 | 281 | 298 |
| Thickening linerity | normal | normal | normal | normal | normal | normal |

TABLE 2-continued

| Items | | Example 6 | Example 7 | Example 8 | Example 9 | Example 10 | Example 11 |
|---|---|---|---|---|---|---|---|
| Compressive strength | 7 d compressive strength, Mpa | 42.5 | 43.2 | 41.6 | 42.7 | 41.8 | 41.1 |
| | 28 d compressive strength, Mpa | 45.1 | 46.2 | 43.4 | 45.5 | 44.3 | 43.9 |

TABLE 3

| Items | | Comparative Example 1 | Comparative Example 2 | Comparative Example 3 | Comparative Example 4 | Comparative Example 5 | Comparative Example 6 |
|---|---|---|---|---|---|---|---|
| Density, g/cm$^3$ | | 1.90 | 1.90 | 1.90 | 1.90 | 1.90 | 1.90 |
| Fluidity, cm | | 21 | 21 | 20 | 22 | 23 | 18 |
| API fluid loss, ml | | 36 | 39 | 44 | 39 | 36 | 37 |
| Free water, % | | 0 | 0.01 | 0.02 | 0.01 | 0.01 | 0 |
| Stability (density variation) g/cm$^3$ | | 0.26 | 0.34 | 0.40 | 0.19 | 0.17 | 0.03 |
| Thickening properties | Resting temperature, ° C. | 200 | 220 | 240 | 240 | 240 | 240 |
| | Cycling temperature, ° C. | 180 | 200 | 220 | 220 | 220 | 220 |
| | Thickening time, min | 209 | 162 | 263 | 275 | 275 | 198 |
| | Thickening linerity | normal | bulging | stepping | normal | normal | normal |
| Compressive strength | 7 d compressive strength, Mpa | 35 | 30 | 25 | 46.20 | 46.20 | 34.70 |
| | 28 d compressive strength, Mpa | 29.7 | 23.3 | 20.5 | 48.80 | 48.80 | 31.50 |

As can be seen from the data in Table 1, the density of the ultra-high temperature resistant cement slurry system for cementing of the present disclosure is adjustable. For the ultra-high temperature resistant cement slurry systems for cementing of all the Examples, the fluidity is greater than 22 cm, the API fluid loss is less than 50 mL, and the free water content is 0, which meet the requirements for cementing construction. The test of thickening properties indicates that the thickening time of the ultra-high temperature resistant cement slurry systems for cementing of all the Examples of the present disclosure is adjustable, and the thickening curve is normal, with no abnormal phenomena such as "bulging". The test of compressive strength of cement stone indicates that as for the cement stone cured from the ultra-high temperature resistant cement slurry system for cementing of all the Examples of the present disclosure, both the conventional density system and the high density system have a 7 d (7 days) compressive strength of more than 40 MPa, and the low density system has a 7 d (7 days) compressive strength of more than 35 MPa.

The difference between the cement slurry system of Example 1 and that of Comparative Example 1 mainly lies in that in Example 1, 2.5 parts of the suspension stabilizer in Comparative Example 1 is replaced with 3 parts of the ultra-high temperature suspension stabilizer, and 20 parts of the ultra-high temperature reinforcing material is added. As can be seen from the comparison of the data in Tables 1 and 3, under the same experimental conditions, the fluidity of the cement slurry system of Comparative Example 1 is 21 cm, and the fluidity of the cement slurry system of Example 1 is 24 cm, indicating that the ultra-high-temperature suspension stabilizer of the present disclosure improves the fluidity of the cement slurry system. The 7 d compressive strength of the cement stone cured from the cement slurry system of Comparative Example 1 is 35 MPa, and the 7 d compressive strength of the cement stone cured from the cement slurry system of Example 1 is 42.5 MPa. The 7 d compressive strength of the cement stone is increased by 21.4%, indicating that the ultra-high temperature reinforcing material of the present disclosure effectively improves the mechanical properties of the cement stone under high temperature.

The difference between the cement slurry system of Example 3 and that of Comparative Example 2 mainly lies in that in Example 3, 3 parts of the suspension stabilizer in Comparative Example 2 is replaced with 4 parts of the ultra-high temperature suspension stabilizer, and 20 parts of the ultra-high temperature reinforcing material is added. Under the same experimental conditions, the cement slurry system of Comparative Example 2 has a thickening curve with "bulging", a density variation of 0.34 g/cm$^3$, and a free water content of 0.01%: the cement slurry system of Example 3 has a normal thickening curve, a density variation of 0.02 g/cm$^3$, and a free water content of 0. This indicates that the ultra-high temperature suspension stabilizer of the present disclosure effectively solves the problems of abnormal thickening curve, core wrapping and settling of cement slurry; and improves the stability of cement slurry. The 7 d compressive strength of the cement stone cured from the cement slurry system of Comparative Example 2 is 30 MPa, and the 7 d compressive strength of the cement stone cured from the cement slurry system of Example 3 is 40.8 MPa. The 7 d compressive strength of the cement stone is increased by 36%, indicating that the ultra-high temperature reinforcing material of the present disclosure effectively improves the mechanical properties of the cement stone under ultra-high temperature.

Example 2, Example 3, and Example 4 are cement slurry systems with densities of 1.35 g/cm³, 1.90 g/cm³, and 2.35 g/cm³, respectively. The cement stone of Example 2 has a 7 d compressive strength of 36.4 MPa, a density variation of 0.02 g/cm³, and an API fluid loss of 46 mL. The cement stone of Example 3 has a 7 d compressive strength of 40.8 MPa, a density variation of 0.02 g/cm³, and an API fluid loss of 37 mL. The cement stone of Example 4 has a 7 d compressive strength of 43.6 MPa, a density variation of 0.03 g/cm³, and an API fluid loss of 42 mL. Under the same experimental conditions, the compressive strengths are effectively improved compared to that of the cement stone of Comparative Example 2: the density variations are less than or equal to 0.03 g/cm³: the density is adjustable; and other properties satisfy the performance of ultra-high temperature cementing construction.

The difference between the cement slurry system of Example 5 and that of Comparative Example 3 mainly lies in that in Example 5, 3.5 parts of the suspension stabilizer in Comparative Example 3 is replaced with 4.5 parts of the ultra-high temperature suspension stabilizer, and 20 parts of the ultra-high temperature reinforcing material is added. Under the same experimental conditions, the cement slurry system of Comparative Example 3 has a thickening curve with "stepping", a fluidity of 20 cm, a density variation of 0.40 g/cm³, and a free water content of 0.02%: the cement slurry system of Example 5 has a normal thickening curve, a fluidity of 23 cm, a density variation of 0.03 g/cm³, and a free water content of 0. This indicates that the ultra-high temperature suspension stabilizer of the present disclosure effectively solves the problem of poor fluidity and stability of the cement slurry system at a high temperature of 240° C.

The difference between the cement slurry system of Example 5 and the cement slurry systems of Comparative Examples 4 and 5 mainly lies in that in Example 5, the specific formulations of the high temperature suspension stabilizers in Comparative Examples 4 and 5 are changed. Under the same experimental conditions, the cement slurry system of Comparative Example 4 has a density variation of 0.19 g/cm³, and a free water content of 0.01%; the cement slurry system of Comparative Example 5 has a density variation of 0.17 g/cm³, and a free water content of 0.01%; the cement slurry system of Example 5 has a density variation of 0.03 g/cm³, and a free water content of 0. This indicates that the problem of poor stability of the cement slurry system at a high temperature of 240° C. can be effectively solved only when the specific composition of the ultra-high temperature suspension stabilizer provided in the present disclosure is used. The difference between the cement slurry system of Example 5 and that of Comparative Example 6 mainly lies in that in Example 5, the ultrahigh-temperature reinforcing material, metakaolin in Comparative Example 6 is replaced with the ultra-high temperature reinforcing material. Under the same experimental conditions, the cement slurry system of Comparative Example 6 is thickened severely and the thickening time is shortened significantly. This is mainly due to the fact that although the metakaolin has an anti-decay effect at high temperature, its compatibility with the system is poor. On the other hand, The ultra-high temperature reinforcing material of the present disclosure has a good compatibility with the cement slurry system and effectively improves the mechanical properties of cement stone at high temperature.

Thus, the ultra-high temperature resistant cement slurry system for cementing provided by the present disclosure has a strong temperature-resistance, a wide applicable range (an applicable temperature of 30° C.-240° C.), and an excellent settlement stability. The cement slurry system has a density of 1.35-2.35 g/cm³ and a density variation of not more than 0.04 g/cm³ (preferably not more than 0.03 g/cm³) when operating at the applicable temperature (particularly at 220° C. to 240° C.): the density is adjustable to meet the requirement on the density of the cement slurry system under different working conditions. Moreover, the cement slurry system of the present disclosure has excellent rheological properties, a small thixotropy, an adjustable thickening time within the applicable temperature range, low initial consistency during thickening, and a short ash time (within 50 s), which avoids the problems of "bulging" and "stepping" of the thickening curve. The thickening curve is normal, which solves the problem of poor stability and strength decline of the cement slurry system under the condition of 220° C.-240° C., and the linear relationship between the thickening time and the temperature, density, or the like is good. At the same time, the cement slurry system of the present disclosure can effectively prevent the decline of compressive strength of cement stone at high temperature and make the 28 d compressive strength of cement stone more than 35 MPa. Therefore, the ultra-high temperature resistant cement slurry system for cementing of the present disclosure can guarantee the safety of cementing construction in deep wells, ultra-deep wells and extra-ultra-deep wells under high temperature and ultra-high temperature, ensure the cementing and sealing effect, and improve the cementing quality.

The invention claimed is:

1. An ultra-high temperature resistant cement slurry system for cementing, comprising by weight: 100 parts of cement, 15-50 parts of an ultra-high temperature strength stabilizer, 15-50 parts of an ultra-high temperature reinforcing material, 0-140 parts of a density regulator, 1-6 parts of an ultra-high temperature suspension stabilizer, 0-2 parts of a dispersant, 2-9 parts of a fluid loss additive, 0.1-9 parts of a retarder, 0.1-0.5 part of a defoaming agent, and 40-120 parts of water,
wherein the ultra-high temperature suspension stabilizer comprises by weight: 1-3 parts of an ether-based starch, 1-3 parts of an aluminosilicate, and 1-2 parts of a polyalcohol polymer.

2. The ultra-high temperature resistant cement slurry system for cementing according to claim 1, wherein the ether-based starch comprises one or more of carboxymethyl starch, carboxyethyl starch, carboxypropyl starch, carboxyhexyl starch, sulfoethyl starch, and sulfo-2-hydroxypropyl starch.

3. The ultra-high temperature resistant cement slurry system for cementing according to claim 1, wherein the aluminosilicate is a nano-sized aluminosilicate.

4. The ultra-high temperature resistant cement slurry system for cementing according to claim 3, wherein the nano-sized aluminosilicate comprises one or more of nano-sized orthoclase, nano-sized zeolite, nano-sized anorthite, and nano-sized halloysite.

5. The ultra-high temperature resistant cement slurry system for cementing according to claim 1, wherein the polyalcohol polymer comprises one or more of polyvinyl alcohol, polyethylene glycol, and polyethylene oxide.

6. The ultra-high temperature resistant cement slurry system for cementing according to claim 1, wherein the ultra-high temperature reinforcing material comprises one or more of halloysite, mullite and tricalcium phosphate.

7. The ultra-high temperature resistant cement slurry system for cementing according to claim 6, wherein the ultra-high temperature reinforcing material comprises a mixture of halloysite, mullite and tricalcium phosphate in a weight ratio of (1-2):(1-2):(1-2).

8. The ultra-high temperature resistant cement slurry system for cementing according to claim 1, wherein:
    the ultra-high temperature strength stabilizer comprises quartz sand;
    the density regulator comprises refined iron mine powder and/or glass microbead;
    the dispersant comprises an aldehyde-ketone polycondensate-based dispersant and/or a polystyrene sulfonate-based dispersant;
    the fluid loss additive comprises an acrylamide polymer-based fluid loss additive;
    the retarder comprises an acrylamide polymer-based retarder and/or a 2-acrylamide-2-methylpropanesulfonic acid polymer-based retarder; and
    the defoaming agent comprises one or more of an organic ester, polyoxypropylene glycerol ether and polydimethylsiloxane.

9. The ultra-high temperature resistant cement slurry system for cementing according to claim 8, wherein:
    the ultra-high temperature strength stabilizer comprises high purity acid-washed quartz sand of 100-1500 mesh and/or high purity quartz sand of 100-1500 mesh;
    the refined iron mine powder has a density of 5.05-7.20 g/cm$^3$; and
    the glass microbead has a density of 0.44-0.65 g/cm$^3$.

10. The ultra-high temperature resistant cement slurry system for cementing according to claim 8, wherein the organic ester comprises tributyl phosphate.

11. The ultra-high temperature resistant cement slurry system for cementing according to claim 1, wherein the cement comprises a class G oil well cement.

12. The ultra-high temperature resistant cement slurry system for cementing according to claim 1, wherein the cement slurry system has a density of 1.35-2.35 g/cm$^3$, an applicable temperature of 30° C.-240° C., and a density variation of not more than 0.04 g/cm$^3$ in the applicable temperature range.

13. The ultra-high temperature resistant cement slurry system for cementing according to claim 12, wherein the cement slurry system has an applicable temperature of 200° C.-240° C., and a density variation of not more than 0.04 g/cm$^3$ in the applicable temperature range.

14. The ultra-high temperature resistant cement slurry system for cementing according to claim 13, wherein the cement slurry system has an applicable temperature of 220° C.-240° C.

15. A method for preparing the ultra-high temperature resistant cement slurry system for cementing according to claim 1, comprising the steps of:
    (1) homogeneously mixing by weight 100 parts of cement, 15-50 parts of the ultra-high temperature strength stabilizer, 15-50 parts of the ultra-high temperature reinforcing material, 0-140 parts of the density regulator, 1-6 parts of the ultra-high temperature suspension stabilizer, and 0-2 parts of the dispersant, to obtain a dry mix;
    (2) homogeneously mixing by weight 2-9 parts of the fluid loss additive, 0.1-9 parts of the retarder, 0.1-0.5 part of the defoaming agent and 40-120 parts of water, to obtain a wet mix; and
    (3) under stirring, uniformly adding the dry mix obtained from step (1) into the wet mix obtained from step (2), and continuing to stir for a period of time, to obtain the ultra-high temperature resistant cement slurry system for cementing.

16. The method for preparing the ultra-high temperature resistant cement slurry system for cementing according to claim 12, wherein in step (3), the dry mix obtained from step (1) is uniformly added into the wet mix obtained from step (2) at a rotational speed of 4,000±200 r/min, and then the stirring is continued for 35-50 s at a rotational speed of 12,000±500 r/min, to obtain the ultra-high temperature resistant cement slurry system for cementing.

17. A method of using the ultra-high temperature resistant cement slurry system for cementing according to claim 1, comprising the step of applying the slurry system to a deep well, an ultra-deep well, and/or an extra-ultra-deep well at high and/or ultra-high temperatures.

18. The method according to claim 17, wherein the high and/or ultra-high temperatures are 200° C.-240° C., the deep well has a depth of 4,500-6,000 m, the ultra-deep wells has a depth of 6,000-9,000 m, and the extra-ultra-deep wells has a depth of 9,000 m or more.

19. The method according to claim 18, wherein the high and/or ultra-high temperatures are from 220° C. to 240° C.

* * * * *